(12) United States Patent
Felker et al.

(10) Patent No.: US 11,728,986 B2
(45) Date of Patent: Aug. 15, 2023

(54) CRYPTOGRAPHIC DATA ENTRY AND TRANSMISSION OF SENSOR DATA

(71) Applicant: Rubidex, LLC, Lutz, FL (US)

(72) Inventors: Michael Felker, Lutz, FL (US); Clay S. Perreault, New York, NY (US)

(73) Assignee: Rubidex, LLC, Lutz, FL (US)

( * ) Notice: Subject to any disclaimer, the term of this patent is extended or adjusted under 35 U.S.C. 154(b) by 0 days.

(21) Appl. No.: 17/704,499

(22) Filed: Mar. 25, 2022

(65) Prior Publication Data

US 2022/0311608 A1    Sep. 29, 2022

Related U.S. Application Data

(60) Provisional application No. 63/166,109, filed on Mar. 25, 2021.

(51) Int. Cl.
*H04L 9/08* (2006.01)
*H04L 9/00* (2022.01)
*H04L 9/14* (2006.01)

(52) U.S. Cl.
CPC ........... *H04L 9/14* (2013.01); *H04L 9/088* (2013.01); *H04L 9/0894* (2013.01); *H04L 9/50* (2022.05)

(58) Field of Classification Search
CPC ......... H04L 9/14; H04L 9/088; H04L 9/0894; H04L 9/50
USPC .......................................................... 380/44
See application file for complete search history.

(56) References Cited

U.S. PATENT DOCUMENTS

| 10,404,668 | B2* | 9/2019 | Tissot | H04L 63/0428 |
| 10,447,784 | B2* | 10/2019 | Britt | H04W 4/21 |
| 10,846,268 | B2 | 11/2020 | Roche, Jr. | |
| 11,088,830 | B2* | 8/2021 | Gu | H04L 9/3239 |
| 11,314,885 | B2 | 4/2022 | Teel et al. | |
| 11,321,472 | B1* | 5/2022 | Aizikovich | H04L 9/0894 |
| 2009/0147949 | A1* | 6/2009 | Kirovski | H04L 9/083 |
| | | | | 713/193 |

(Continued)

FOREIGN PATENT DOCUMENTS

| WO | 2019204213 A1 | 10/2019 |
| WO | 2019214066 A1 | 11/2019 |
| WO | 2021042213 A1 | 3/2021 |

OTHER PUBLICATIONS

SEGA: Secured Edge Gateway Microservices Architecture for IIoT-Based Machine Monitoring, Ghosh et al., Aug. 2021 (Year: 2021).*

(Continued)

*Primary Examiner* — Jahangir Kabir

(74) *Attorney, Agent, or Firm* — Perkins Coie LLP; Collin Fowler

(57) ABSTRACT

Disclosed herein are systems and methods to ensure that data collected from remote sensors sent to cloud-based storage, as well as commands sent to remote actuators from cloud-based control systems remain in a highly encrypted, redundant and resilient form at all times other than in volatile memory (e.g., while in use). Device to device automated sensing and control is also considered and addressed by this focus. Data from industrial sensors requires validation in both the "root of trust" within the sensor/actuator itself to ensure that the data is being transmitted or received from a valid device as well as ensuring that the data has not been manipulated or altered or viewed while in transit.

6 Claims, 12 Drawing Sheets

(56) References Cited

U.S. PATENT DOCUMENTS

| | | |
|---|---|---|
| 2017/0075938 A1 | 3/2017 | Black et al. |
| 2017/0085555 A1 | 3/2017 | Bisikalo et al. |
| 2018/0181957 A1 | 6/2018 | Crabtree et al. |
| 2018/0324154 A1 | 11/2018 | Crabtree et al. |
| 2019/0012595 A1 | 1/2019 | Beser et al. |
| 2019/0073146 A1 | 3/2019 | Ateniese et al. |
| 2019/0114182 A1 | 4/2019 | Chalakudi et al. |
| 2019/0306176 A1 | 10/2019 | Gleichauf |
| 2019/0320014 A1 | 10/2019 | Allen et al. |
| 2019/0379646 A1 | 12/2019 | Mandal et al. |
| 2020/0026834 A1 | 1/2020 | Vimadalal et al. |
| 2021/0014201 A1 | 1/2021 | Crabtree et al. |
| 2021/0174360 A1 | 6/2021 | Davies et al. |
| 2021/0226926 A1 | 7/2021 | Crabtree et al. |

OTHER PUBLICATIONS

Ensuring Proof-of-Authenticity of IoT Edge Devices Using Blockchain Technology, Guin et al, Jul. 2018 (Year: 2018).*
Edge IoT-cloud Framework based on Blockchain, Ismail et al, Oct. 2020 (Year: 2020).*
ISA/US, International Search Report and Written Opinion dated Sep. 6, 2022 for PCT/US22/21917 filed Mar. 25, 2022, Applicant: Rubidex, LLC, 11 pages.
Russia International Search Authority, International Search Report and Written Opinion dated Jun. 24, 2021 for PCT/US2021/020947 filed Mar. 4, 2021, Applicant: Rubidex, LLC, 8 pages.
Henningsgaard, Jake, "Monitoring the Ethereum Blockchain," Oct. 25, 2017, 11 pages.

* cited by examiner

CRYPTOGRAPHIC DATA ENTRY AND TRANSMISSION OF SENSOR DATA

CROSS-REFERENCE TO RELATED APPLICATION(S)

This application claims priority to U.S. Provisional Patent Application No. 63/166,109, filed on Mar. 25, 2021, which is incorporated herein by reference in its entirety.

TECHNICAL FIELD

The disclosure relates to identifying cryptographic data sensing, transmission, command and control structures involved in distributed sensor networks. More particularly, the disclosure relates to data generated by "Internet-of-things" devices and/or sensors.

BACKGROUND

Conventional databases and storage solutions include a number of flaws. For example, many databases suffer from security issues. Data is often stored or transmitted unencrypted and presents a target that can be compromised by malicious actors. Every day corporate databases are breached, and records are stolen. A second issue results from corruption —a total loss of database data due to outside factors, such as lightning strikes, power outages, human error, hacking, bad timing, etc.

Sensor devices have additional vulnerabilities. A sensor may be spoofed, its stored data accessed or manipulated in memory or while the data is in transit. Additionally, commands from external control systems may also be spoofed, or altered while in transit. Additionally, known data encryption schemes tend to have inherent vulnerabilities that create targets for attackers.

DETAILED DESCRIPTION

Figure 1A:
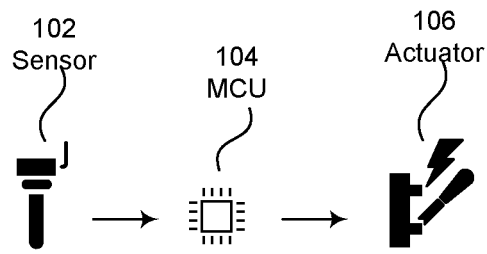
FIGS. 1A-1H are illustrations of existing sensor topologies.

Recent increases in complexity of electronic sensor and control systems such as Supervisory Control and Data Acquisition Systems and programmable logic controllers (collectively "SCADA/PLC") throughout the utility and electrical power grid sectors have resulted in unforeseen, serious vulnerabilities that could threaten the core industrial infrastructure. Legacy systems suffer from the lack of oversight and care for security as a primary focus based on the mistaken belief that unconnected systems were not vulnerable to outside attack. However, recent attacks such as the Stuxnet virus have shown that being disconnected from the Internet does not protect industrial control platforms.

Systems such as utilities, power grids and other types of infrastructure face great challenges as they evolve and are rearchitected to communicate with a greater number of other sensors and systems for data analytics and machine learning. With the hundreds of millions of legacy sensing and control systems currently in place, a "rip-and-replace" strategy for every sensor and control system throughout the entire infrastructure is not cost effective, nor timely enough to address security concerns.

Disclosed herein is a more secure solution that is deployable via the addition or replacement of existing command and control systems for SCADA/PLC sensor systems in industrial applications with SCADA edge appliances that employ a fully encrypted, identity attested, distributed network architecture. Through the application of techniques disclosed herein, industrial sensing and control systems become highly resistant to malicious attack, become impervious to attempts to view or manipulate sensitive data and prevent unauthorized attempts to control industrial systems.

Data is always at risk, both at rest and in motion. Thus, sensitive data should be stored and transmitted encrypted and not be present in non-volatile memory in an unencrypted state. Numerous encryption techniques may be implemented, such as a block cipher. A block cipher is an encryption method that applies a deterministic algorithm along with a symmetric key to encrypt a block of text, rather than encrypting one bit at a time as in stream ciphers. For example, a common block cipher, AES, encrypts 128-bit blocks with a key of predetermined length: 128, 192, or 256 bits. Data pertaining to sensors or Internet-of-things ("IoT") devices often include sensor readings, command and control instructions and all other forms of data processing and/or transmission. Data is decrypted only as needed and only at time of processing or viewing. Data only exists in a decrypted (e.g., plaintext) state only on the specific processing or viewing device as necessary in its volatile memory.

Permanent (e.g., non-volatile) data records are stored within encrypted cipher blocks on a blockchain-like data structure (e.g., implements a linked list of files as blocks that make use of a hash function to order the blocks). In some embodiments, each block is stored in a distributed fashion across a plurality of nodes in a decentralized process where copies of blocks exist in multiple locations.

Edge processing of data from the relevant sensors and IoT devices uses a blockchain protocol for both encryption and decryption processes. The edge processors participate in the block encryption/verification structure and validate data and command and control processes. Entities within sensing, command and control structure attest to the identity of peer entities and validate the data and commands through encrypted communications. The protocol is applied to edge processors and causes those processors to become active mini-nodes within a distributed, encrypted blockchain.

Typical blockchains are cryptographic data structures wherein a distributed network contributes to an immutable ledger of data. Blockchain systems are often associated with a base of users that are identified via cryptographic key pairs including a public key (used to refer to the user, acts as an address) and a private key (used to sign actions taken by the user, related to the public key by a one-way function). New data is submitted to the network and nodes within the network append the data to the end of the blockchain. Blockchain systems have many advantages over conventional databases. That is, they become more and more resistant to data loss or tampering as the number of blocks increases and the blockchain continues to grow. There is no data loss due to corruption because the network is distributed and synchronization between nodes means that damaged nodes can be repaired with data stored by peers. Blockchains are also significantly harder to attack than databases because the data is distributed and, for the most part, immutable.

The blockchain data structure is perhaps most well-known as associated with cryptocurrencies. Fundamentally, a blockchain is a distributed linked list. Many systems have been built on top of cryptocurrency networks, but those systems are inherently based on the existence of some underlying currency and the use thereof. Cryptocurrency applications of blockchains are thus not the most effective structure for effectively managing a single entity data entry system.

Herein, a system is described whereby edge processors are effectively mini-nodes on a distributed blockchain network. Each node does not have to be a full node (e.g., store the full blockchain) to participate. When nodes sync after logging in from a period of inactivity, those nodes first obtain the most recent block in the chain before working backwards toward the genesis block. Data in blocks is stored in small, flat files that include the simplest expression of the information.

Stored data is encrypted into ciphertext. Viewing plaintext data is performed in memory to reduce an attack window for malicious users. For the purposes of this disclosure, "plaintext" is the complement of "ciphertext" and means data that is not encrypted or is pre-encryption or partially encrypted (in the case of multiple cycles of encryption). Plaintext is the input of one or more functions that generate ciphertext.

Blockchains are immutable; that is, once appended, the data of the block is difficult, if not impossible, to change. However, data entry often includes modifications or edits to data. Where data in a given block needs to be changed, the system spawns a new, block structure. As that data is edited new blocks are appended to the blockchain. While the present system includes structural variations from cryptocurrency blockchains, some fundamental architecture is retained.

FIGS. 1A-1H are illustrations of existing sensor topologies. FIG. 1A depicts a sensor to an actuator. In a legacy industrial control scenario, a basic sensing and control process begins where a sensor transducer 102 creates a digital representation of the condition or state of a particular classification in its environment (e.g., temperature, vibration, open/closed, etc. . . . ). The sensor transducer 102 connects to a microprocessor (MCU) 104 where the condition or state of the sensor 102 is processed via a predetermined internal algorithm. The MCU 104 then instructs the system to control external valves or actuators 106 based the internal algorithms of the MCU 104. Where the algorithms determine that an instruction should be sent to the external valve or actuator 106, the command is given and the action proceeds.

Figure 1B:
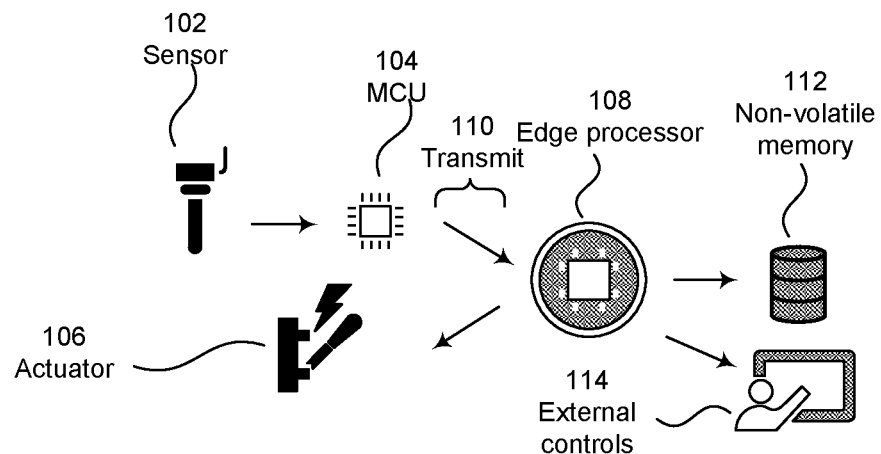

FIG. 1B depicts a system implementing a sensor to an edge processor to an actuator. In a typical industrial control process (SCADA/PLC) a sensor transducer 102 creates a digital representation of the condition or state of a particular classification in its environment (temperature, vibration, open/closed etc). The output of the sensor transducer 102 is processed similarly as above; but, in this scenario the MCU 104 stores the data internally in one of its memory registers and/or transmits the data continuously on a predetermined schedule or when polled to an edge processor device 108. Where the MCU 104 stores the data in internal registers, the MCU 104 listens for an external command (poll) from the edge processor 108 for the contents of the memory registers.

Communication 110 from the sensor 102 to the edge processor 108 typically conforms to one of many types of communications protocols such as Serial, ModBus, CanBus, ProfiNet. In many cases the communications 110 protocols do not require or involve encryption or device identity attestation. When the sensed data arrives at the edge processor 108, internal algorithms within the edge processor 108 process the data. The edge processor 108 acts similarly to the MCU 104 in FIG. 1A and, depending on its internal algorithms, instruct the system to control external valves or actuators 106.

In some cases, the edge processor 108 may determine via internal algorithms to store data within a permanent, non-volatile memory either internally or externally 112 and may also provide interfaces to commercial computer systems via network interfaces such as Ethernet or serial for visual interface for human instrumentation or external control 114 depicting the current and historical state of its algorithms, sensors and actuators. External data presentation via networked computer systems for human interfaces often include secure passwords for viewing the instrumented data or sending manual commands to the system. Internal data storage 112 on these systems does not typically involve encryption processes.

Figure 1C:
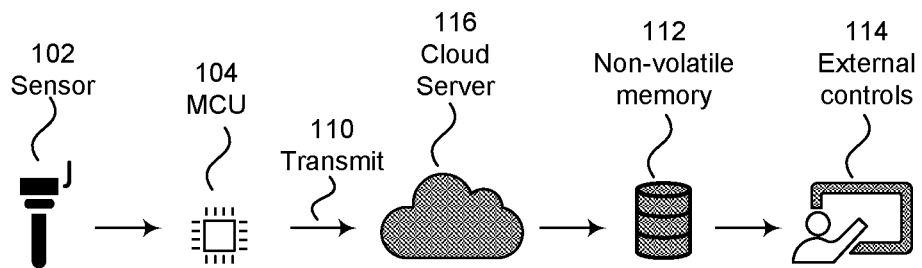

FIG. 1C depicts a sensor to cloud server scenario. Data is sensed on remote edge sensors 102 and then transmitted 110 to servers which process and store the data in traditional databases 112. After some pre-processing, the MCU 104 stores the data internally in one of its memory registers and/or transmits 110 the data on a predetermined schedule or when polled to an external entity such as a cloud-based server 116. On data transmission 110 from the sensor to the cloud-based servers 116, the cloud-based server 116 may execute its own algorithms for additional data processing, analytics and storage 112. The data transmission 110 process may involve one or more transmission protocols and technologies which may or may not add additional encryption or identity attestation.

The cloud-based server architecture may also provide a visual interface 114 for human instrumentation depicting the current and historical state of its algorithms and sensors. Human interfaces often include secure passwords for viewing the instrumented data. Internal data storage 112 on these systems does may or may not involve additional encryption processes.

Figure 1D:
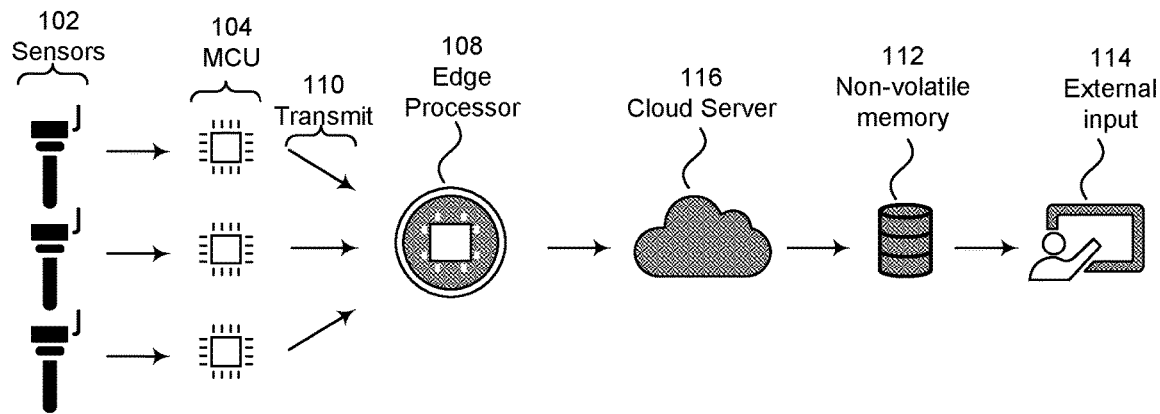

FIG. 1D is a combination of the embodiment of FIGS. 1B and 1C. Specifically, a sensor to edge processor to cloud topology. Data is sensed on remote edge sensors 102 and then transmitted to local edge data processing/control platforms 108 where the data is processed and/or aggregated then transmitted 110 to remote cloud-based servers 116 which further process the data and store it in traditional databases 112.

Figure 1E:
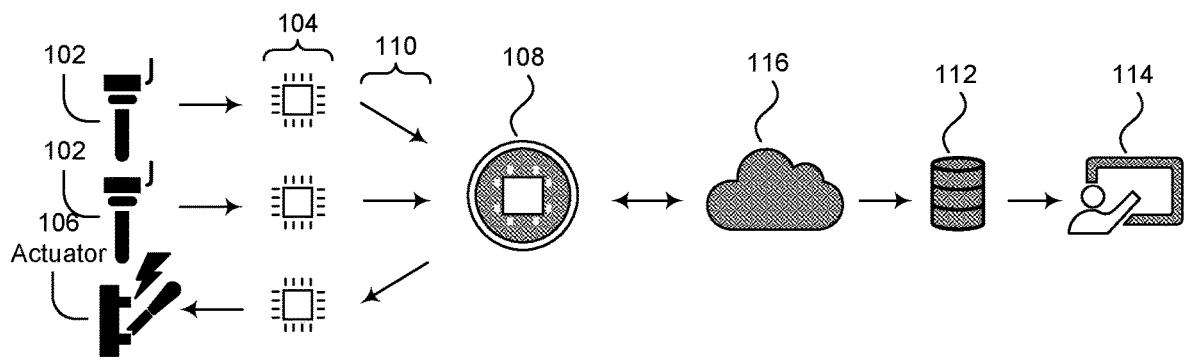

FIG. 1E depicts a sensor to edge processor to actuator and cloud server topology. Data is sensed on remote edge sensors 102 and then transmitted to local edge data processing/control platforms 108 where the data is processed and/or aggregated, and commands are given to local valves or actuators 106 based on internal algorithms within the local edge data processing/control platforms 108. In addition, the data is transmitted to remote cloud-based servers 116 which further process the data and store it in traditional databases 112 on a continuous schedule or when polled.

Figure 1F:
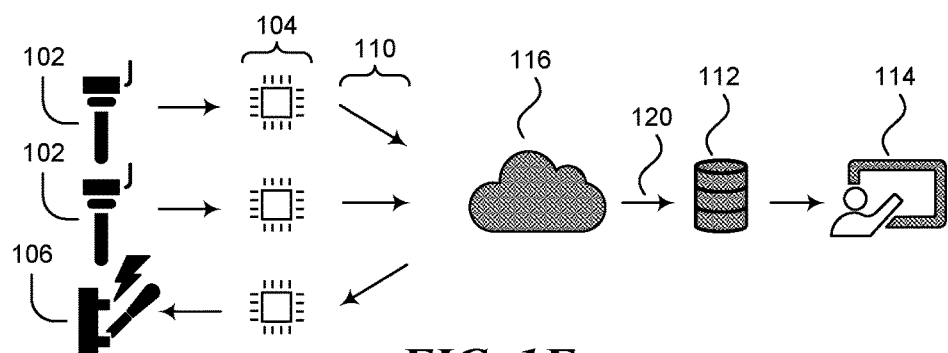

FIG. 1F depicts a sensor to cloud and cloud to actuator topology. Data is sensed on remote edge sensors 102 and then transmitted 110 to cloud-based servers 116 where it is processed and stored in traditional databases 112. In the depicted scenario, cloud-based algorithms additionally transmit commands 110 to valves or actuators 106 based on the sensed data.

Figure 1G:
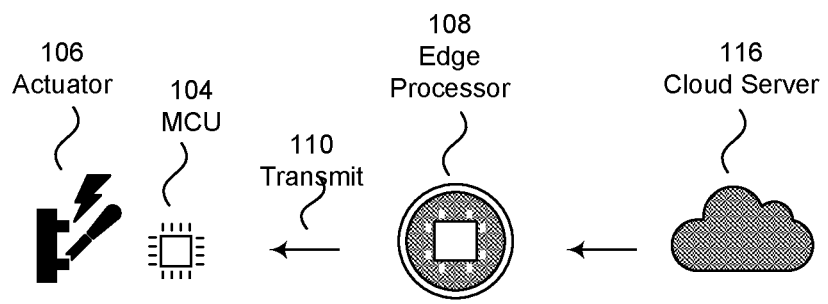

FIG. 1G depicts a cloud to edge processor to actuator topology. Data actuating commands are transmitted from cloud-based servers 116 to modify behavior of remote actuators or sensors 102/106 via intermediary edge computing/control platforms 108. In this scenario, cloud-based servers 116 initiate command and control of remote valves or actuators 106 via an intermediary edge processor 108 The data transmission 110 process may involve one or more transmission protocols and technologies which may or may not utilized encryption or identity attestation. When the commands are received by the edge processor 108, the edge processor transmits those instructions to the remote actuator 106. In many cases the communications 110 protocols do not require or involve encryption or device identity attestation.

Figure 1H:
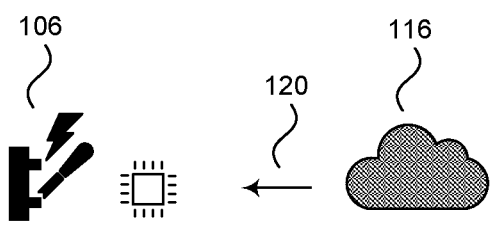

FIG. 1H depicts a cloud to sensor topology. Data and/or actuating commands are transmitted from cloud based server 116 to modify behavior of remote actuators 106 or sensors 102 directly. In this scenario, cloud-based servers 116 initiate command and control of remote valves or actuators 106. When the remotely transmitted 110 commands are received by the remote actuator 106, the commands are executed.

The scenarios depicted in the FIG. 1 series each have one or more security vulnerabilities. In each instance, data typically exists in nonencrypted plaintext in each and every location that the data is stored or transmitted. In some scenarios, security is applied to network ports, but does not extend deeper into any local topology. Security in such scenarios relies on the assumption that malicious actors will not approach the local topology and interface with the entities directly. This assumption is dangerous and misplaced. The human visual interfaces via connected computing platforms present multiple critical vulnerabilities as they typically run vulnerable operating systems and are often not upgraded with security patches on a regular basis.

FIGS. 2A-2G depict illustrations of secured sensor/actuator topologies embodied by methods described by this application. In some embodiments, the only changes that need occur from the examples of FIG. 1 are modifications to firmware and/or communication protocols. In some embodiments, the modifications are embodied by the replacement of a select set of processors (the replaced processors having new firmware). The firmware and communication protocol further engages with a cloud security platform 216. In some embodiments, the changes include the installation of a new control appliances or the addition of new gateway appliances. In either case installation requires relatively few modifications as compared to a full rip-and-replace scheme where many sensors and control systems are replaced within a facility.

In scenarios including components such as memory chips, those chips contain unmodifiable identifiers that are enabled to become all or a part of a sensor device's internal identity attestation of transducers and internal electronic components. The unmodifiable identifiers are often referred to as physically unclonable functions or PUFs. The PUFs are implementable in an identity attestation scheme as used within the MCU 204 of the sensor 202. Additionally, the data is stored in the MCU 204 as ciphertext. As the sensor captures the relevant data, the MCU 204 records that data as encrypted. If the transducer or actuator features its own microprocessor, these identities are decrypted and verified as attested and validated.

Transmissions of data making use of communications protocols 210 are encrypted. Data such as commands to actuate, or sensor data, are each encrypted such that plaintext does not move across the network topology.

In some embodiments, communications via direct electrical voltage with no communications protocols (e.g., from a sensor 202 to a MCU 204) do not make use of encryption. However, where communications protocols exist the firmware is revisable to make use of encryption and attestation.

In some embodiments, sensor platforms are configured to validate transducer identity and encrypt sensed data immediately upon receiving the data. The sensed data remains fully encrypted throughout its journey from the sensor through all communications mediums to all other receiving devices whether it be another sensor, an actuator, an edge processor or cloud-based computing platform. A cloud security platform provides decryption keys via a distributed block architecture.

Edge processing nodes— typically where legacy SCADA/PLC controllers currently reside— become decentralized nodes to the cloud security platform that participate in a blockchain architecture within a facility. In some configurations, additional nodes are placed locally within the same facility to address data communications velocity, latency and network resilience/availability concerns.

Instrumentation of sensed data, whether as collected or from local storage mediums is decrypted only in real-time on the viewing platform; thus, data never transits any network or exists in non-volatile memory as an unencrypted form. Data analytics of sensed data is performed in real time on the viewing platform; thus, data never transits any network or exists in an unencrypted form.

Data storage of sensed data is placed in an encrypted distributed blockchain-based architecture locally within the facility and externally where any unauthorized access for viewing the data would not be possible without a decryption key. Manipulation attempts on data in transit or in storage are detectable due to the nature of chained blocks of data (e.g., immutability of a blockchain). Detection of data manipulation on stored data result in immediate discarding and the real data is recovered from the distributed block architecture.

Figure 2A:
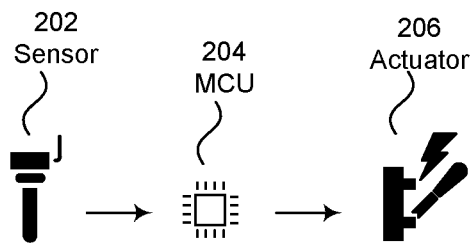
FIGS. 2A-2G depict illustrations of secured sensor/actuator topologies.

FIG. 2A depicts applications of encryption and attestation between an edge processor and data storage. In some embodiments, components such as memory chips contain unmodifiable identifiers and become part of a sensor device's internal identity attestation of transducers and internal electronic components. Symmetric keys are used within the MCU 204 or the sensor 202 as a form of attestation. Attestation makes use of an encrypted component key as part of each data transmission whether from a sensor and/or to a valve or actuator 206. If the sensor 202 or actuator 206 features its own microprocessor, these identities can be decrypted and verified as attested and validated.

The edge processor 208 acts as a node in a distributed system that maintains a blockchain of encrypted data. Data stored internally within the edge processing node 212 is encrypted and each data insertion from the sensor 202 into the internal data structure 212 becomes a part of a distributed blockchain architecture. The distributed system engages with a cloud security platform 218. Further, communications 210 initiated between the sensor 202 and the edge processor 208 use symmetric encryption keys that are validated at the edge processor 208 for both the identity of the sensor 202 and, if applicable, the identity of the sensors transducers 202.

Decryption keys for the sensor and components are stored within a cloud security platform 218 and are queried and cached for a predetermined time with an established expiry time within the edge processing device 208. The response from the cloud security platform 218 includes cache timeouts for the decryption keys. In the edge processor 208, the decryption keys are stored in volatile memory; thus, if powered down these keys would be lost.

In order to provide for rapid attestation and accommodate scenarios where communications 210 between the edge processor 208 and other devices running the cloud security platform 218, the local edge processor 208 acts as a blockchain node on the cloud security platform 218 and self-validates with other localized nodes until such time as connectivity is restored. Additional nodes are placed within the same facility to provide locally attested identity and key validation. Upon restoration of communications 210 local nodes synchronize with external nodes and continue operation.

Security features are further applied to data instrumentation. Human interfaces 214 are protected where data remains in its encrypted form while stored or in motion and is only decrypted into plaintext within memory of the viewing device by an authorized user.

Figure 2B:
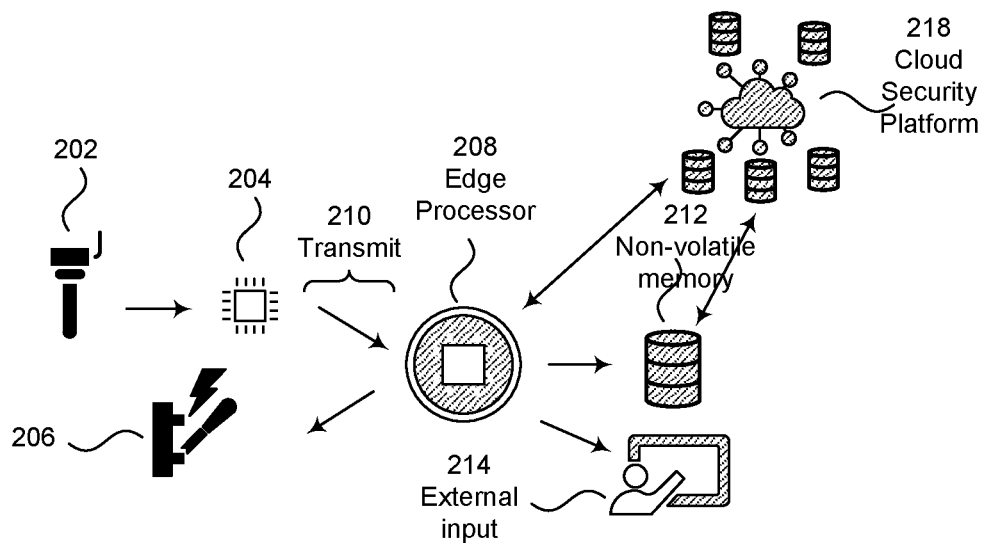

FIG. 2B depicts applications of encryption and attestation between a cloud server and data storage. The operation of the topology illustrated in FIG. 2B operates similarly to the topology of FIG. 2A, except the edge processor 208 is replaced with a cloud server 216. The cloud server 216 similarly acts as a node of the cloud blockchain based security platform 218.

Figure 2C:
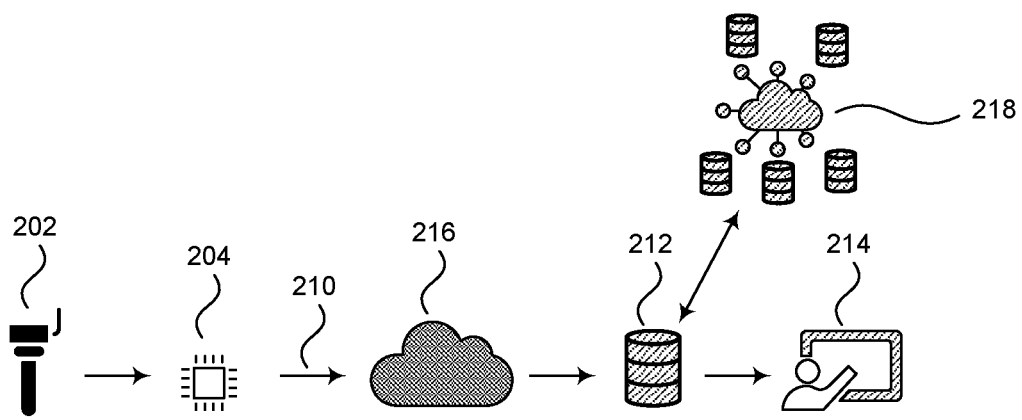

FIG. 2C depicts applications of encryption and attestation between an edge processor, a cloud server and data storage. The operation of the topology illustrated in FIG. 2C operates similarly to a combination of the topology of FIGS. 2A and 2B. As depicted, both the edge processor 208 and the cloud server 216 act as nodes in the cloud blockchain based security platform 218.

Figure 2D:
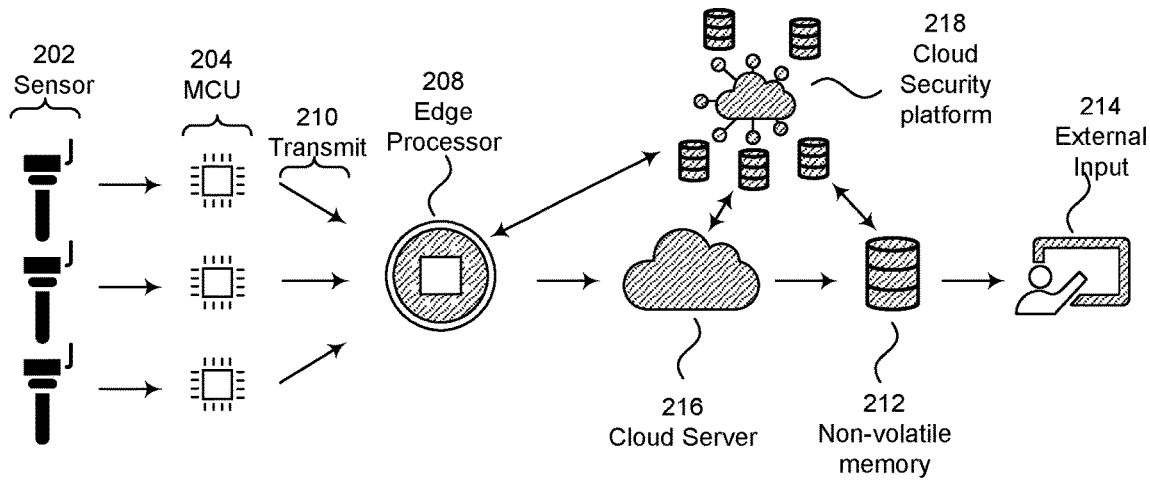

FIG. 2D depicts applications of encryption and attestation between an edge processor and an actuator. Data actuating commands are transmitted from the edge processor 208 to modify behavior of remote actuators or sensors 202/206. In this scenario, the edge processor 208 initiates command and control of remote valves or actuators 206 based on sensor data. The sensor data is received by the edge processor 208 in an encrypted format. The edge processor 208 queries the cloud security platform 218 for decryption keys and attestation that the command is valid that are applied in the cache of the edge processor 208 to decrypt the sensor data in order to subsequently determine whether commands should be transmitted to the actuator 206.

Figure 2E:
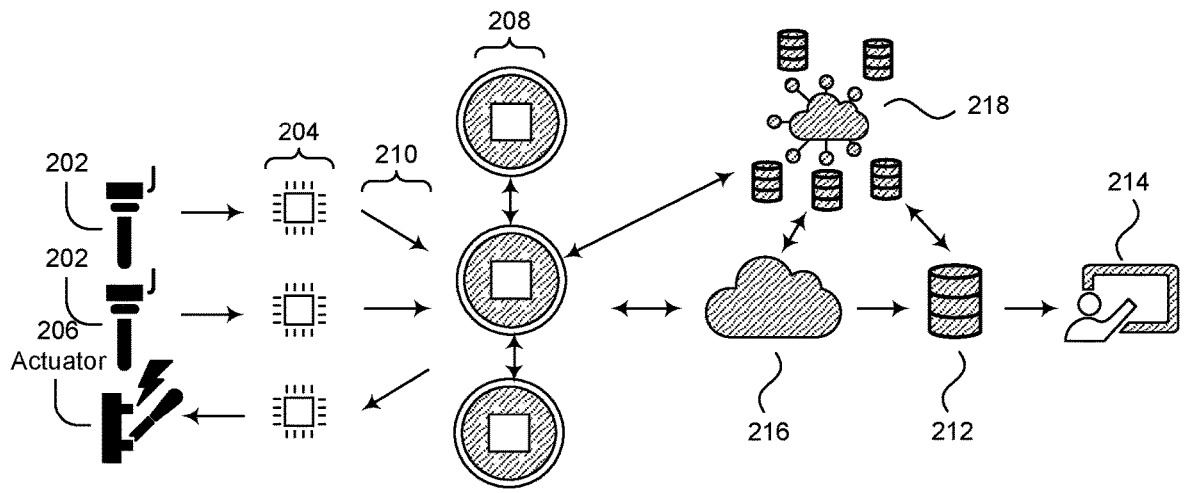

FIG. 2E depicts applications of encryption and attestation between a cloud server and an actuator. The operation of the topology illustrated in FIG. 2E operates similarly to the topology of FIG. 2D, except the edge processor 208 is replaced with a cloud server 216. The cloud server 216 similarly acts as a node of the cloud security platform 218. In the depicted example, multiple sensors 202 are responsible for causing an actuator 206 to operate. Encryption and attestation occurs locally between edge processors 208 within a remote facility during regular operation or upon loss of Internet connectivity to the cloud 216 based networks.

Figure 2F:
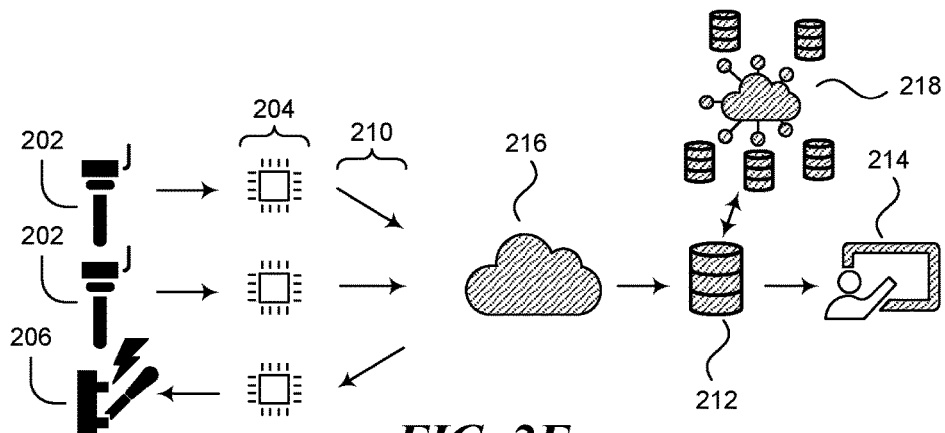

FIG. 2F depicts applications of encryption and attestation from a cloud server through an edge processor to an actuator. Data actuating commands are transmitted 210 from the cloud server 216 to an edge processor 208 to modify behavior of remote actuators or sensors 202/206. In this scenario, the cloud server 216 initiates command and control of remote valves or actuators 206 based on sensor data.

Figure 2G:
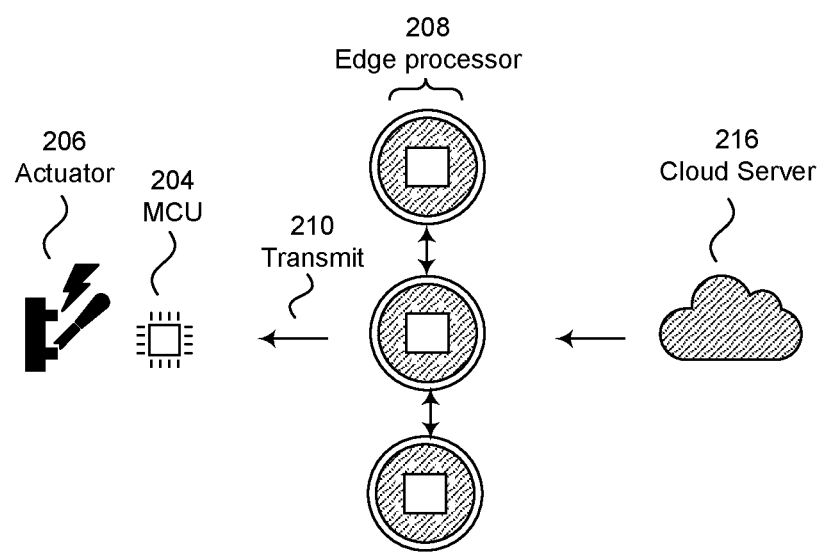

FIG. 2G depicts applications of encryption and attestation from a cloud server to an actuator. The operation of the topology illustrated in FIG. 2G operates similarly to the topology of FIG. 2F, except the edge processor 208 is removed. The cloud server 216 similarly acts as a node of the cloud security platform 218. In some embodiments, the device will have limited capabilities thus attestation is done through validated encryption processes. Similarly to above examples, instructions are sent from the cloud 216 and the edge processor attests to the validity of the command by querying multiple instances of the blockchain or alternatively another trusted intermediary device.

Figure 3:
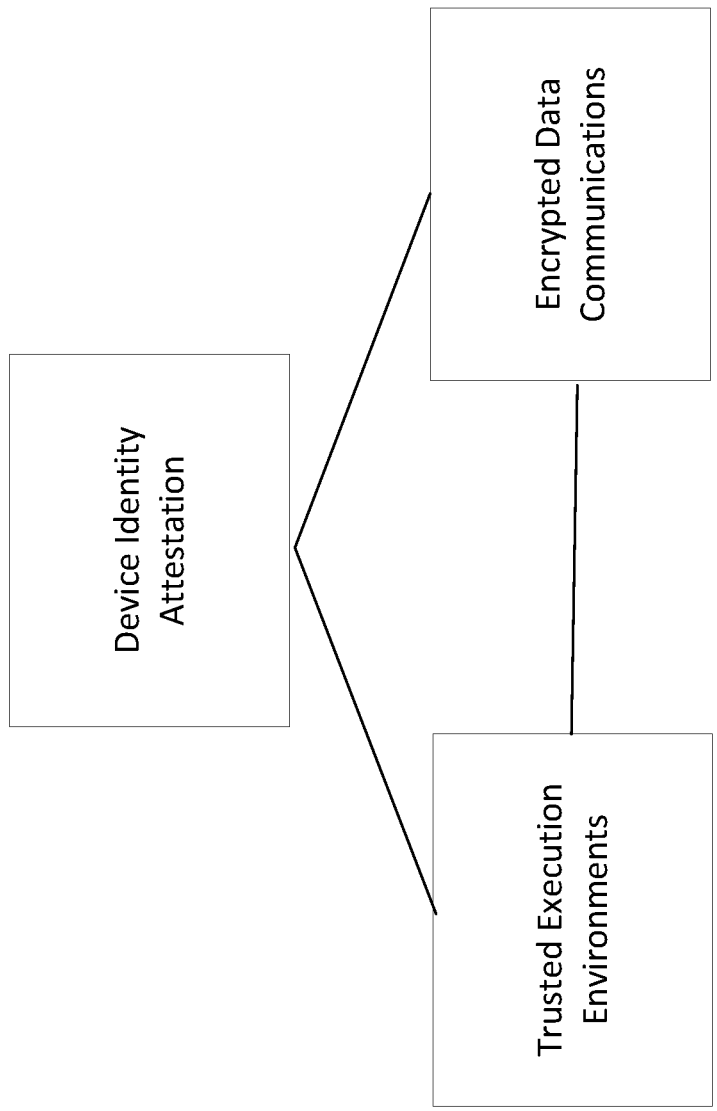
FIG. 3 illustrates root-of-trust building blocks.

FIG. 3 illustrates root-of-trust building blocks. Device security can be described as a series of "building blocks" to provide the core set of hardened functionalities that enables an IoT device to establish itself as a trustworthy node suitable for inclusion in one or more groups of IoT devices, sensor or control networks. The three major blocks are device identity attestation, trusted execution environments and encrypted data communications.

IoT sensor and control systems are most often deployed and maintained on a continuous basis with devices and platforms being implemented at various times and locations. The continuous maintenance presents an environment that is in a constant state of flux forming and re-forming collections of devices which all implement a variety of distributed applications. Devices not yet recognized as members of a particular sensing or control application are considered "untrusted," while devices already part of the solution are considered "trusted." Membership in a sensor network involves trust negotiation where the device presents evidence of trustworthiness; for example, the device may be equipped with a "root-of-trust" hardened environment containing a manufacturer embedded attestation key. The root-of-trust is designed to meet a set of security features and assurances as a basis for trust. Secure key storage and secure cryptographic operations are important capabilities of a root-of-trust that can be used to implement attestation.

Attestation protocols allow the root-of-trust to prove to a verifier that it is capable of protecting secrets, identities, and data. When an untrusted device is onboarded into a coalition, it first attests to its level of trustworthiness. This allows the attestation verifier to determine if the desired coalition is appropriate or if some other coalition is more appropriate. Attestation is a form of operational integrity checking that should be pervasive throughout a sensing or control implementation. IoT devices should respond to changes that might invalidate recent checks and respond proactively by updating integrity profiles and rechecking. If an attack is successful, the attestation check can detect it and respond appropriately.

Trusted computing is a broad term that refers to technologies for resolving computer security problems through hardware enhancements and associated software modifications within a device. Modern devices that use hardware chipsets from vendors such as ARM and Intel can optionally utilize specially designed execution environments within the chipset itself to protect themselves and their data from cyber-attack. These specially designed areas within the processor are called a Trusted Execution Environment (TEE) for executing trusted application code. A trusted execution environment is an effective implementation to detect, prevent, or counter security events occurring in other parts of the system.

Secure communications between a device, sensor or controller utilize trusted code that implements cryptographic algorithms used to protect the confidentiality and integrity of the data exchanged between devices and their peers. Encrypted data communications are critical to both data flow into cloud-based storage and analytics platforms as well as device to device communications between sensors and control actuators within a sensor network. Cryptographic algorithms are typically stored within a trusted execution environment within onboard processors and interact with encryption key management systems using protocols such as PKI, or Kerberos.

Figure 4:
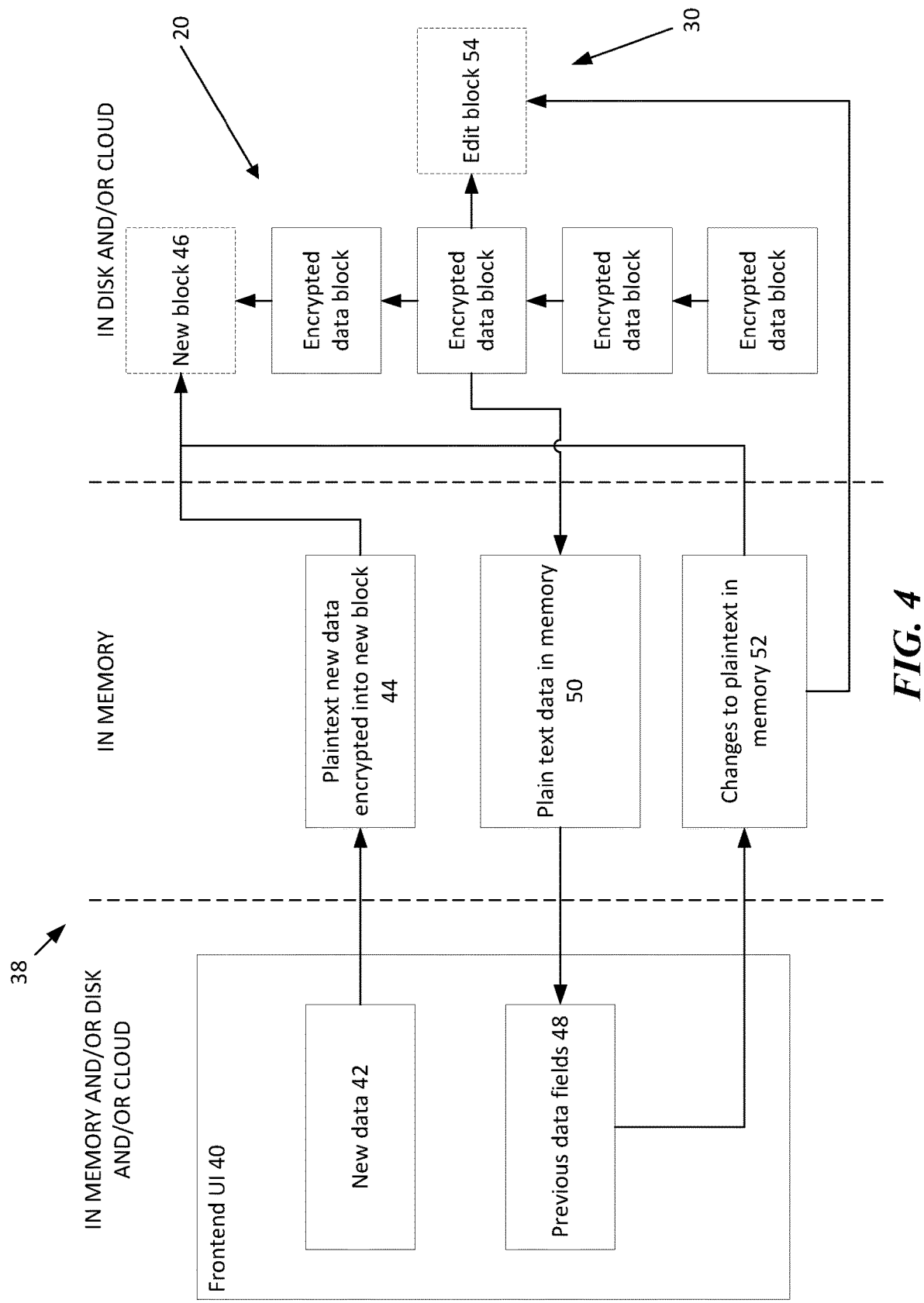
FIG. 4 is a block diagram illustrating a relationship between a client front end and accessibility to the blockchain.

FIG. 4 is a block diagram illustrating a relationship between a front-end interface and accessibility to the blockchain. A given edge processor or cloud actor operates a node of a data manipulation system 38. The data manipulation system 38 includes a frontend interface 40 that references a blockchain 20, 30 stored on a disk, a cloud server, a hard disk of a blockchain network peer-node, or other suitable storage medium or storage location. The frontend interface 40 corresponds to the MCU, edge processor, cloud server, or human user interface as described above. The frontend interface 40 is an interface for manipulating data generated by sensors and/or actuators.

The data within the blockchain 20, 30 is encrypted and is decrypted in local system memory for use in the frontend interface 40. "Memory" in this context refers to random-access memory ("RAM") or other volatile storage structures. Memory is distinct from "disk" or "hard disk" storage, which refers to non-volatile storage.

Use of the frontend interface 40 obfuscates the existence of the blockchain 20, 30 and a user of the frontend interface 40 is not necessarily aware of the blockchain's existence. The blockchain 20, 30 is a data structure that securely stores the sensor data or control commands. The blockchain 20, 30 exists in the backend of data manipulation system 38 and the user does not directly interact with the blockchain. A human user would be unable to make sense of the block files because each contains encrypted and hashed data. Thus, a malicious actor must have access to the frontend interface 40, or local system memory while the frontend interface 40 is in use to access decipherable data.

The frontend interface 40 is customizable to a given user or organization's purpose. Whatever data needs that user/organization has, the frontend interface 40 is built accordingly. While using the frontend interface 40 a sensor generates new data 42 via whatever input interface is present with respect to the frontend interface 40. While that entered new data 42 is still in local system memory, the data manipulation system 38 converts that plaintext data into encrypted data 44 for storage as a new block 46 on the blockchain 20. The new block 46 is appended to the end of the blockchain 20. The new data 42 is encrypted in real-time, in memory, after being generated by the sensor. In some embodiments, blocks are written to the node, the server and sent to the cloud/backup drive at the same time. Blocks sent to the server and backup drive are preferably done so using SSH transmission allowing an end-to-end encrypted tunnel.

Where a user seeks previously entered data 46, the data manipulation system 38 triggers a process whereby data is retrieved from the blockchain 20, 30, the data is decrypted and presented to the user on the frontend interface 40. In some embodiments, data is retrieved via use of an unencrypted userID portion of each block. Based on the userID, the system identifies the blocks that will have decryptable data. In some embodiments such as asymmetric encryption, attested interfaces 40 query a server for a decryption key that is stored only in volatile memory and used to decrypt the stored data 20. Asymmetric encryption, or asymmetrical cryptography, solves the exchange problem that plagued symmetric encryption. Asymmetric encryption achieves the problem by creating two different cryptographic keys (hence the name asymmetric encryption)—a private key and a public key. With asymmetric encryption, a message still goes through mathematical permutations to become encrypted but requires a private key (which should be known only to the recipient) to decrypt and a public key (which can be shared with anyone) to encrypt a message.

The data retrieval process is transparent to the user based on operations of the frontend interface 40. The source of the data is not expressly revealed to the user. Data is retrieved from the blockchain 20, 30, and decrypted in memory 50. Once decrypted in memory 50, the plaintext data is represented to the user on the frontend interface 40.

Where the user makes changes to previously entered data 48, the changes are made in memory 52, encrypted and put into either a new block 46 or an edit block 54 on a branch blockchain 30 based on the embodiment implemented and/or the type of data being modified. In some embodiments without branch blockchains 30, edited data goes in new block 46 and is appended to the main blockchain 20.

Data security is maintained by keeping unencrypted data off hard disks. The window for an attacker to consume the data is thus significantly narrower than systems that transmit unencrypted data or store unencrypted data.

Figure 5:
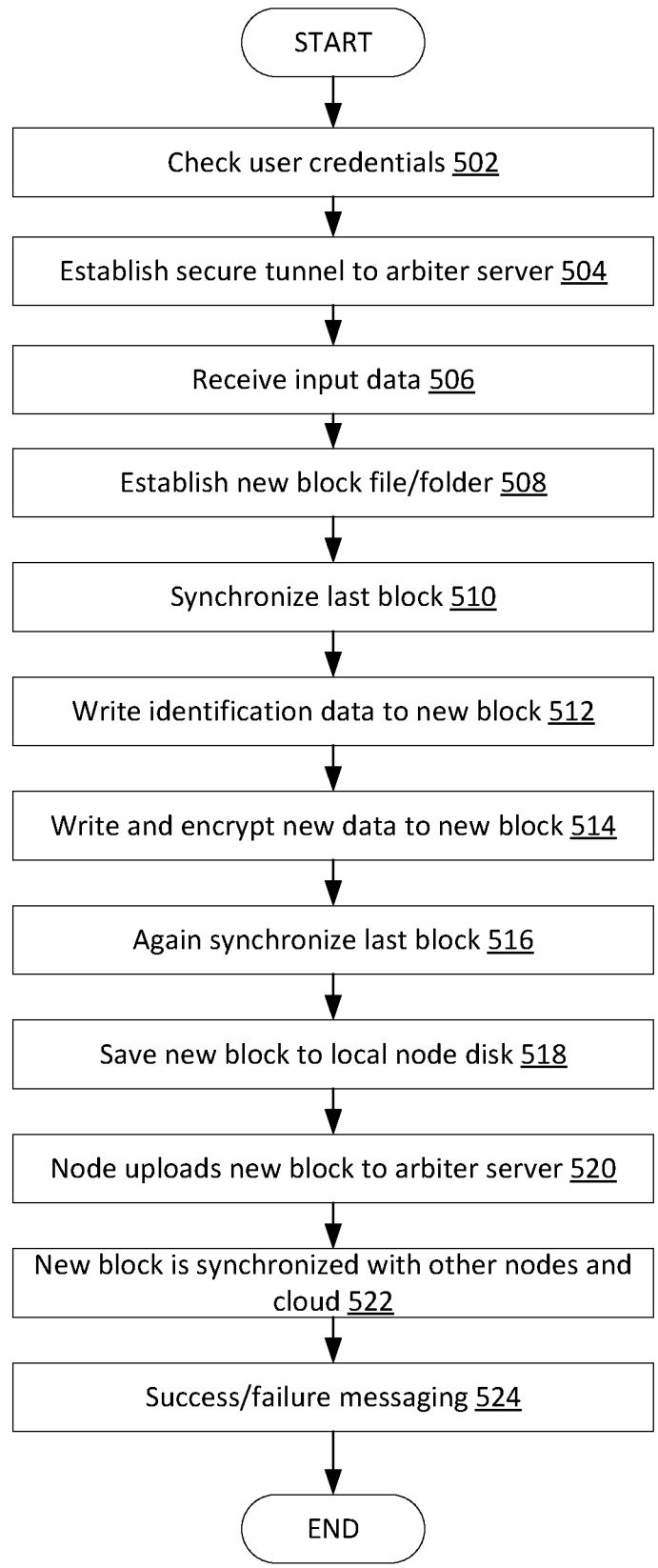
FIG. 5 is a flowchart illustrating a method of appending data to the blockchain.

FIG. 5 is a flowchart illustrating a method of appending data to the blockchain. Entities append data to the blockchain via frontend interface. Legitimate appending can be initiated only through the frontend interface, by an entity that has attested its identity. In some embodiments, cryptographic keypairs enforce the ability to append to the blockchain. The program code that accesses the keypairs in the frontend interface cannot be executed without being attested. Thus, in step 502 the system ascertains the current entity's credentials. The credentials can be inspected through a number of means including multi-factor authentication (MFA). A non-exhaustive list of factors may include PUFs, geolocation locked (e.g., the location of the device using the frontend interface), second device locked, external time-to-live codes, biometric key, and login credentials.

In step 504, the local node establishes a secure tunnel (e.g., SSH and/or SCP encrypted tunnel formats) with a first server via login information. In some embodiments, the first server may be referred to as an arbiter server. The arbiter server is configured to coordinate block ordering across multiple simultaneous attempts at appending to the blockchain by a number of nodes. In step 506, the local node, via the frontend interface, receives input data and stores the data as a variable in local system memory. Display of the new data on the frontend interface is performed via access to the memory. The new data, in plaintext form, is not stored on the local disk drive of the local node. Whether the input data is appended to the main blockchain or a branch blockchain is a function of the data retrieval process (discussed in further detail below).

Based on an appending request by a local node, in step 508, an arbiter server generates a new block file or folder and synchronizes file or folder names with the local node. The arbiter server maintains the linear ordering of the blocks on the blockchain. Where the arbiter server generates a new block file, the arbiter server has established the local node's request into a given position on the blockchain. At this stage, the new block file or folder does not include any payload data. In an alternate embodiment, the local node first creates the new block file/folder and obtains a naming component from the arbiter server that establishes the linked list reference to the last block. During generation of the new block, the last block may change based on other nodes submitting blocks. The name of the new block is dynamically modified throughout generation to update reference to the last block.

This process does not change regardless of which portion of the blockchain is being appended to. Regardless of where the new block goes, there is still a new block on some chain. The naming convention of the new block indicates the order of the block in the blockchain. The names of the blocks are generated dynamically in order to accommodate multiple nodes simultaneously attempting to append data. In some embodiments, the block file/folder naming convention includes adding the "_x" to the end of the name, where x is the last block+".b1" (e.g., a file type designation). The file type designation ".b1" is an arbitrary choice, and any file name extension could be used. The system is configured to recognize particular file type designations based on system design. The new block is named using the last block number.

In step 510, the local node synchronizes the last block with the arbiter server to ensure the node has the most recent copy by comparing the latest hash. In step 512, identifying data is inserted into the file/folder for the new block. Identifying data includes: a hash of the last block inserted into the new block file, the userID of the logged in entity, a new block hash, and a time/date stamp. The identifying data may be indicated in a header portion of the new block file or via use of delimiters. The synchronizer is enabled to re-order blocks when necessary (e.g., due to simultaneous submission) and ensures last hash integrity. The use of a last block integer counter updates file names during the appending process (in some embodiments, the update further includes the last hash). This file is also locked to a permission of 000 to ensure it cannot be altered by outside sources. In some embodiments, the local node reorders blocks locally based on time stamps of each received block.

In some embodiments, all portions of a block are encrypted in the block except the ID, last hash and current hash. In the new block system, logging information will also be included in the block itself. The block includes an ID (last block #), last hash from the previous block, new hash, time/date stamp, logged username who created the block, the group affiliation and all new data to be encrypted.

Synchronization is a background process initiated by a separate software utility (per node) and is automatic. No input is required. Synchronization loads at startup when a computer system is rebooted/turned on and runs silently in the background, synchronizing necessary missing or new blocks. The synchronization allows new blocks to be created during periods where no internet is available to be uploaded to the server and/or cloud drive. Renaming/re-ordering by block number in the file name is done automatically if needed and sorted by time/date stamp. Where the timestamps are encrypted, the blocks are decrypted to evaluate the timestamps and then re-encrypted and renamed using the new blocker ordering number.

In step 514, the local node encrypts (in memory) and writes the plaintext new data into ciphertext in the payload of the new block file/folder. The system does not encrypt the identifying data such as the last/new hash or entity attestation. In some embodiments, the time/date is similarly not encrypted. In some embodiments, the new data may be written to the local copy of the new block file/folder prior to encryption, or vice-versa. In this manner, the plaintext of the new data does not exist outside of local system memory for more time than required to encrypt the plaintext.

The encryption is performed using an associated encryption key. In some embodiments, the associated encryption key is the private key of the associated cryptographic keypair. In some embodiments, the key used to encrypt the new data is a separate unrelated key that indicates a permission level (e.g., all entities within a given sub-class of entities share a cipher key). Entities in various levels of a hierarchy of entities may have multiple cipher keys based on the level of permissions required to access the data. Examples of suitable encryption methods include SHA3-512 bit and AES-128 or 256-bit level encryption. In some embodiments, the system uses random strong passwords and hardware key lookup in a triple nested array. In some embodiments, the same, single cipher key is used across all permission levels and a given entity's "key" instead refers to an association to block numbers that the system will implement the single cipher key upon to decrypt for that entity. In those embodiments, the entity's key is a matter of protocol permissions as opposed to cryptographic relationships.

In step 516, the last block is again synchronized between the local node and the arbiter server to determine that the local node still has the most recent version. In step 518, the new block is saved to disk on the local node. In step 520, the local node uploads the new block as saved to the arbiter server via the secure communication tunnel. Integrity is constantly checked to ensure the last block is truly the last block (e.g., if during the save process the last block changes from 60 to 61, then the node will write the block as 62, upload it and then upload the new last block file with the number 62). The synchronizer is there just in case two identically numbered blocks are attempted to be written at the same time.

In step 522, the new block is synchronized with other nodes and a second server. In some embodiments, the second server may be referred to as a cloud server. In step 524, a success or failure message is issued to the participant devices.

Blocks are transmitted to the server and cloud drive in near real time on all nodes. The blocks thus exist on the server and backup drive. The node downloads the block back and then reads the encrypted data into an array (in memory). The data is then decrypted in the array. The last block is appended twice— once before the block data is written (in step 512) and again (step 516) after the block data is written to ensure the given block is truly the last block. If the new last block is not on the server/backup drive yet, the arbiter server generates an error and a small wait time is in place to then try again. The synchronizer ensures no duplicate blocks exist and performs re-ordering if any two nodes just happen to write the same block at the same time (down to the millisecond)— if so, the time/date stamp is used to ensure order (again, down to the millisecond). The earliest time is given preference.

Figure 6:
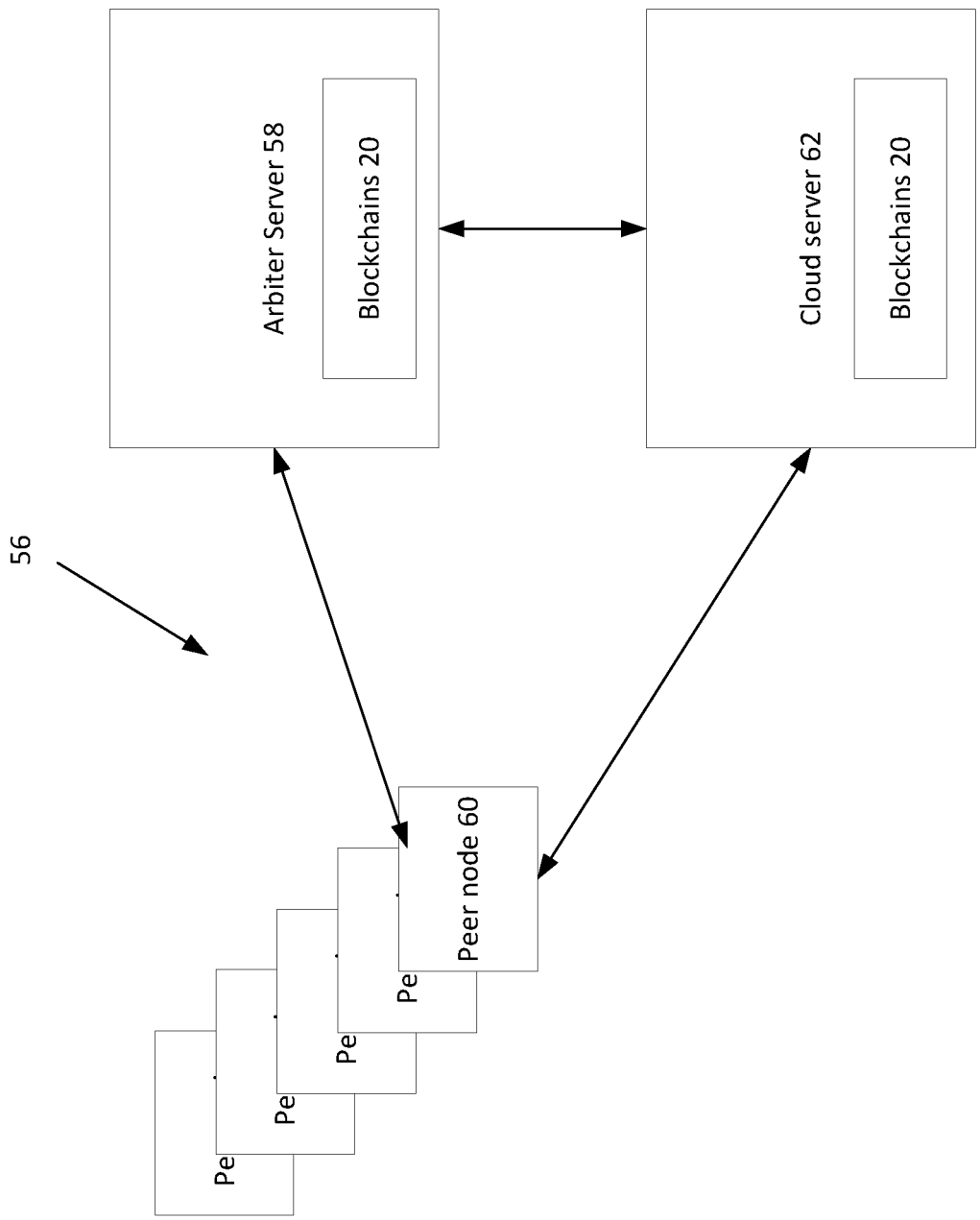
FIG. 6 is a block diagram of an arbiter server in a peer network.

FIG. 6 is a block diagram of an arbiter server 56 in a peer network 58. The peer network 56 includes a number of distributed nodes, or peer nodes 60. The peer nodes 60 synchronize with copies of the blockchains 20 stored on both the arbiter server 58 and the cloud server 62. For a local node to operate on the peer network 58, the peer nodes 60 do not necessarily each have to store the entire, or most up to date versions of the blockchain 20.

Synchronization of the peer nodes 60 occurs at regular intervals while the peer nodes 60 are communicating with the network; however, a given node 60 that has been offline for some time will not necessarily have the most up to date version of the blockchain 20. Where a node is rejoining the network after a period of inactivity, synchronization causes the node to receive all missing blocks. In some embodiments, the peer nodes 60 communicate directly between one another while executing a periodic synchronization process on the blockchain data and obtain updated synchronization data from amongst one another.

Synchronization is an analog process to consensus conducted in traditional cryptocurrency based blockchains. Through synchronization, the immutability of the blockchain 20, 30 is enforced.

Figure 7:
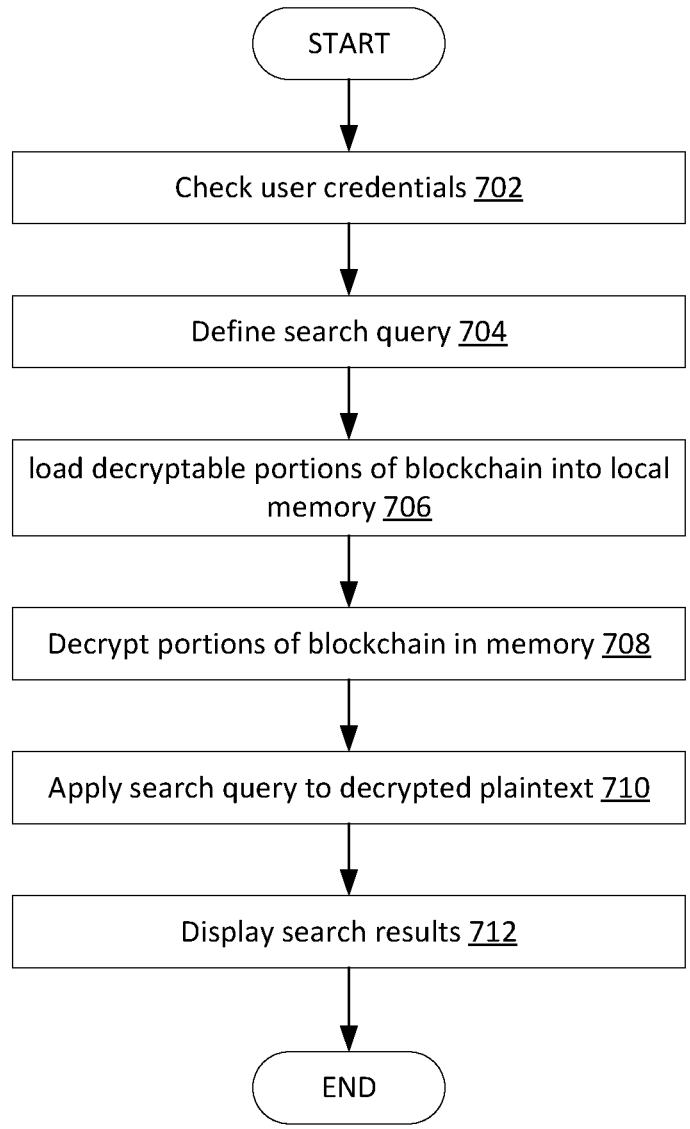
FIG. 7 is a flowchart illustrating a method of legitimate data retrieval from the blockchain.

FIG. 7 is a flowchart illustrating a method of legitimate data retrieval from the blockchain. Data requests of data on the blockchain can be made in a number of ways based on the configuration of the frontend interface. However, ultimately, the frontend interface operates using a search function. The search query used may be user generated, based on edge processing protocols/actuation controls, or interface generated based on configuration and each given use case.

Similarly to appending data, entities must be attested in order to decrypt data into plaintext. Anyone with access to the blockchain may view the data therein, but the data is stored as ciphertext and is incomprehensible to those without an associated cipher key that is accessed (indirectly) via the frontend interface. Thus, in step 702, the local node verifies entity credentials in the same manner as in step 502 of FIG. 5.

Entities have varying levels of permissions. In some embodiments, entities are only able to make requests of data it appended to the blockchain. In some embodiments, entities are only able to make requests of data within their entity class (or of lower tier entity classes). Entity class tiers may be sideways—that is, even a highest tier entity in one branch may not have access to data appended by an entity of a sideways user class (e.g., an edge processor navigating a Navy vessel may not need access to an edge processor identifying weapon system status).

In step 704, the system defines the search query. If the frontend interface is looking to fill a particular field, then the search query may be defined by the frontend interface. Specifically, when data is entered in the related field, a unique code may be appended to the data that corresponds directly to a search query. Thus, the search query will only be satisfied by data including the unique code. Search results for the query will have a single result and the UI element retrieves the proper data. In some embodiments, the search query is less particular, and a given user may be searching the blockchain for desired data using other techniques.

In step 706, the local node loads portions of the blockchain that may be decrypted by that user and stores the plaintext in local memory. The blocks that are loaded into node local memory may be either a local copy stored on the local disk or from either the arbiter server or the cloud server. The portions of the blockchain that may be decrypted by the given user are indicated based on the unencrypted userID recorded in each block.

In step 708, the local node decrypts the blocks stored in memory. The decryption makes use of an appropriate cipher key held by the local node and authorized by the active entity. Decryption of the blockchain may occur in parallel because there is a separate file for each block. The encryption is not blockchain wide (e.g., every character of the blockchain) but rather performed on a per block basis.

In step 710, the search query is applied to the plaintext of the decrypted blocks. Where the blockchain has become too large for the user to store entirely in memory, the search query may be applied to the blocks as each is decrypted. The searching node discards blocks from memory where a search engine operating with the search query is below a threshold confidence or relevance score on the plaintext of the given block. In contrast to the described techniques, databases are generally encrypted or decrypted in their entirety as opposed to on an entry-by-entry basis as described herein. Encryption/decryption on the block level is more discrete and enables more efficient data processing. Additionally, each data element in a database tends to have a larger data size and is therefore more cumbersome both algorithmically and individually.

The threshold confidence is based on an applied search algorithm. Where the search engine makes use of exact matches (e.g., seeking specific pointer codes) plaintext blocks that are below exact matches may be discarded. The search engine may make use of a keyword search or a knowledge graph wherein results are given confidence or relevance ratings connected to how connected a given result is to the initial keyword search or how related the given result is based on the knowledge graph. Regardless of the search engine style used, a threshold filter is applied to results in each block. Where a given block does not include any plaintext content that is above the threshold confidence or relevance score, there is little reason to retain that data in limited memory space. Accordingly, the low confidence/relevance score plaintext data is discarded.

As one block is discarded, a new block may be read into memory, decrypted and searched (the results of the search are discarded or kept in memory as applicable). "Discarding" refers to clearing relevant space in the volatile memory. When a decrypted block is discarded, the original block remains stored in non-volatile storage in encrypted form. However, the plaintext version is gone. In step 712, the search results are presented via the frontend interface.

Figure 8:
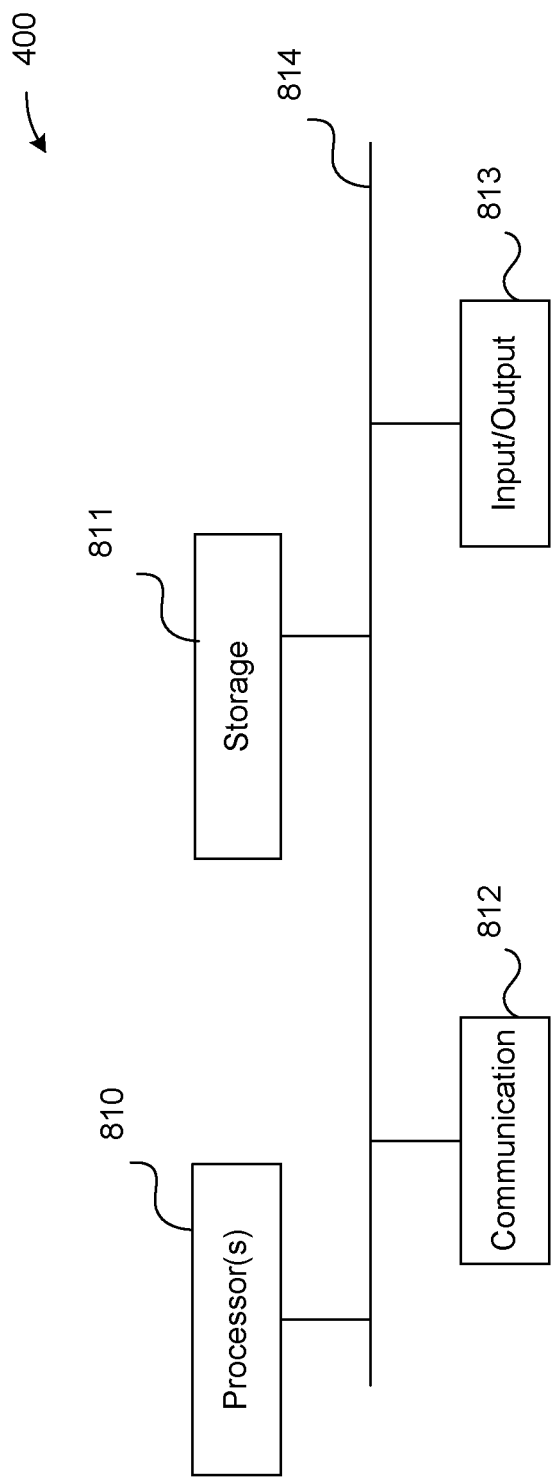
FIG. 8 is a block diagram of an exemplary computing system.

FIG. 8 is a high-level block diagram showing an example of a processing device 800 that can represent a system to run any of the methods/algorithms described above. A system may include two or more processing devices such as represented in FIG. 8, which may be coupled to each other via a network or multiple networks. A network can be referred to as a communication network.

In the illustrated embodiment, the processing device 800 includes one or more processors 810, digital storage 811, a communication device 812, and one or more input/output (I/O) devices 813, all coupled to each other through an interconnect 814. The interconnect 814 may be or include one or more conductive traces, buses, point-to-point connections, controllers, scanners, adapters and/or other conventional connection devices. Each processor 810 may be or include, for example, one or more general-purpose programmable microprocessors or microprocessor cores, microcontrollers, application specific integrated circuits (ASICs), programmable gate arrays, or the like, or a combination of such devices. The processor(s) 810 control the overall operation of the processing device 800. Digital Storage 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Digital storage 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 800 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A system comprising:
a plurality of endpoint devices that generate data streams that are encrypted by a local microcontroller unit prior to providing the data stream to a plurality of edge processors, the data stream remaining encrypted during transmission and when stored in non-volatile memory, wherein plaintext operation on the data streams is present only during a given operation thereon and not between operations;
the plurality of edge processors in direct physical communicative connection to the plurality of endpoint devices, wherein the plurality of edge processors are each nodes in a local distributed network that maintains a distributed blockchain data structure of the data streams in encrypted form;
non-volatile memory storage communicatively connected to the plurality of edge processors over a cloud platform, the cloud non-volatile memory storage stores the data stream as encrypted and present to a viewing device to decrypt within the viewing device for an authorized user; and
a host server that communicates with the plurality of edge processors via a remote network connection and controls distribution of decryption keys to the plurality of edge processors.

2. The system of claim 1, further comprising:
an actuator communicatively coupled with a first edge processor of the plurality of edge processors that is configured to actuate based on commands from the first edge processor, the commands based on plaintext evaluation of at least a portion of the data streams in volatile memory.

3. The system of claim 1, wherein the decryption keys are stored in volatile memory of the plurality of edge processors.

4. The system of claim 3, wherein the decryption keys have a predetermined time to live in the volatile memory of the plurality of edge processors.

5. The system of claim 1, wherein the plurality of edge processors are configured to query the host server for decryption keys and attestation upon receipt of an encrypted command input.

6. The system of claim 1, wherein the decryption keys are each associated with paired encryption key stored locally on the plurality of endpoint devices or the plurality of edge processors.

* * * * *